United States Patent [19]

Bennett

[11] 4,031,174

[45] June 21, 1977

[54] PROCESS OF PRILLING MOLTEN MATERIALS

[75] Inventor: Frank William Bennett, Woodbridge, England

[73] Assignee: Fisons Limited, London, England

[22] Filed: July 10, 1975

[21] Appl. No.: 594,674

Related U.S. Application Data

[63] Continuation-in-part of Ser. No. 437,216, Jan. 28, 1974, abandoned.

[30] Foreign Application Priority Data

Feb. 9, 1973 United Kingdom ............... 6592/73
Apr. 18, 1973 United Kingdom ............ 18609/73

[52] U.S. Cl. ................................................ 264/14
[51] Int. Cl.$^2$ .......................................... B01J 2/04
[58] Field of Search ............................... 264/13, 14

[56] References Cited

UNITED STATES PATENTS

| | | | |
|---|---|---|---|
| 2,811,748 | 11/1957 | Smith | 264/13 |
| 3,058,159 | 10/1962 | Ishizuka et al. | 264/13 |
| 3,231,640 | 1/1966 | Klopf | 264/13 |

*Primary Examiner*—Robert F. White
*Assistant Examiner*—James R. Hall
*Attorney, Agent, or Firm*—Wenderoth, Lind & Ponack

[57] ABSTRACT

A process for prilling molten materials, e.g. molten sulphur and molten fertilizer materials, in which molten droplets are prilled down a prilling tower into a countercurrent gas stream which carries drops of a volatilizable material which volatilizes on contact with the molten material and removes heat from the molten material so as to form solid skinned droplets. The solid-skinned droplets are collected, e.g. from a fluidized bed in the base of the prilling tower.

10 Claims, No Drawings

PROCESS OF PRILLING MOLTEN MATERIALS

The present invention relates to a process for prilling a molten substance and is a continuation-in-part of my earlier application Ser. No. 437,216 filed Jan. 28, 1974, now abandoned.

It has been common practice to form solid particles from a molten material by allowing droplets of the material to fall down a void tower up which a stream of cooling gas is flowing. However, this process requires the use of a very tall tower if the droplets are to be sufficiently solidified to remain intact upon hitting the base of the tower.

We have now found that if a suspension of drops of a minimum size of a material which volatilizes on contact with the molten droplets is caused to flow countercurrent to the molten droplets, then the height of the prilling tower required may be reduced. Surprisingly, little or none of the volatile component is retained by the molten droplets and the product may therefore be produced substantially free from contamination and, where the volatile component is water, not significantly more moist than prills obtained by conventional air prilling techniques, even when the product is not subsequently dried.

Accordingly, the present invention provides a process for prilling a molten material which process comprises causing droplets of the molten material to travel against a countercurrent flow of drops of a material, which volatilizes on contact with the droplets of the molten material, suspended in a carrier gas stream which is saturated with respect to the volatile material, said gas stream flowing at a velocity of 0.1 to 10 meters per second and said drops of volatile material having a mean diameter of from 60 to 500 micrometers; the volatile material being one which volatilizes on contact with the droplets of the molten material whereby heat is removed from the molten material so as to form droplets with at least a solid skin; and collecting the resulting solid skinned droplets.

The process is preferably carried out in a vertical tower by causing the molten material droplets to fall down the tower with the flow of volatile drops passing up the tower. For convenience, the invention will be described in relation to operation in a vertical tower although it will be appreciated that other orientations may be used, e.g. horizontal injection into a void chamber.

The material which is to be volatilized is a liquid which has a boiling point under the conditions of use which is below the melting point of the molten material droplets. Desirably, the volatile material is one with a high latent heat of vaporization and a high specific heat so that the maximum amount of heat is removed from the molten material droplet as it passes through the suspension of drops. The volatile material need not be inert to the molten material, but may comprise an ingredient which it is desirable to incorporate into the solidified droplet, e.g. to enhance its thermal stability or anti-caking properties.

Suitable volatile materials for present use include water and organic liquids, such as a low boiling alcohol, ketone or halogenated hydrocarbon. If desired, the volatile material may be a solution of a substance in water or an organic solvent, the solute being a substance which it is desired to incorporate into the solidified droplet.

The suspension of drops is conveniently formed by spraying the volatile material under pressure with or without a carrier gas into the prilling tower to form a mist of drops in the carrier gas which carries the drops up the tower. If need be, supplementary carrier gas may be added separately, although we have found that the spraying operation usually draws sufficient gas into the tower for it to be unnecessary to provide separate means for feeding secondary gas to the tower. A convenient method for forming the suspension of drops in the tower is to spray liquid into the basal portion of the tower by means of jets located around the circumference of the tower and directed up the tower. If desired the jets may also be inclined tangentially to the tower so as to impart a swirl to the suspension formed within the tower. As indicated above, we have found that drops must be of a certain minimum mean size for satisfactory cooling to take place. This minimum mean size is 60 micrometers. While larger drop sizes may be used, these require increasing velocity to suspend them and we prefer to use drops with mean sizes of not more than 500 micrometers. Particularly preferred mean drop sizes are in the range 70 to 200 micrometers. These drop sizes are in respect of the drops as introduced into the prilling tower, i.e. are initial drop sizes.

The gas used to carry or suspend the drops of volatile material in the tower is usually air, although other gases such as nitrogen or carbon dioxide may be used as appropriate.

The materials to be prilled are ones which normally pick up comparatively large amounts of moisture when prilled into water or when contacted with water. For example when sulphur is prilled into a water bath the prills contain as much as 5% of water and this renders the prills unsatisfactory for many uses. Water soluble fertilizer materials, e.g. ammonium nitrate or urea, these readily pick up water from the air making them sticky and not easily handled. It is therefore most unexpected that one is able to produce comparatively dry and easily handled solid prills by the process of the invention. The process of the invention is of special use in the prilling of sulphur and fertilizer materials such as ammonium nitrate, ammonium sulphate nitrate, ammonium phosphate, mixtures of ammonium nitrate with for example mono- or di- ammonium phosphate, potassium chloride or magnesium nitrate, with or without other materials, potassium phosphate, potassium nitrate, sodium nitrate, and mixtures of any of these. The process is most particularly suited to the prilling of molten sulphur, molten urea and molten mixtures of urea. Other materials which may be prilled by the present process include alkali-metal hydroxides. It is usually desired that the molten material to be prilled has a water content of not more than 10% by weight, preferably less than 5%.

In the process of the invention droplets of the molten material are formed in any convenient manner, e.g. by the use of a spinning basket prilling head, by spraying the molten material, or allowing the molten material to flow through a plurality of fine apertures in the base of a rainmaker prilling head, to form droplets of the desired size range, e.g. from 0.5 to 4 mms. The droplets then fall through a zone containing drops of volatile material suspended in a gas stream flowing countercurrent to the falling molten droplets. As they fall through the suspension, the molten droplets collide with the drops of the volatile material and heat is removed from the molten material. It is therefore desirable that a maximum amount of contact occurs between the molten material droplets and the volatile drops. This may be achieved by injecting volatile material into the tower at a high rate. However, the upper limit of rate of injection of the volatile material is dictated by the load of suspended drops which the gas stream flowing up the tower can carry. While the load carried by the gas stream can be increased by increasing the linear velocity of the gas up the tower, the linear velocity must not exceed the terminal velocity of the droplets of molten material being prilled into the tower. We therefore prefer to use a linear velocity in the tower of not more than 10 meters per second. On the other hand, high velocity requires expensive pumping installations and from an economic standpoint it is preferred to use a low linear velocity. However, a minimum velocity is set by the terminal velocity of the drops of the volatile material, which velocity must be equalled or exceeded if the drops are to be suspended in the gas stream. We therefore prefer to use a linear velocity of more than 0.1 meters per second in the tower. While it will be appreciated that the loading of the gas stream and its velocity can be varied to suit a given case, it is essential that the gas stream be saturated with the volatile material in order for drops of the volatile material to exist. This saturation requirement applies to that part of the tower through which the suspension of drops flows and need not hold true for other parts of the tower. In practice it is enough to ensure that sufficient volatile material is injected into the tower to supersaturate the total volume of gas being injected into the tower. While the dew point of the gas stream may vary with temperature, we have found that local fluctuations in temperature within the tower do not significantly affect the successful operation of the process and for the purposes of this invention, saturation denotes the overall state of the gas at the temperature in which it leaves the tower.

While it would be thought desirable to achieve total cooling and solidification of the molten droplets as they pass through the suspension of volatile drops, this is usually not necessary in that droplets which have been solidified to 60% or less by weight are usually sufficiently strong enough to be subjected to conventional handling and processing techniques. Furthermore, the residual heat in the partially solidified droplets aids removal of any volatile material remaining thereon and it may be possible to dispense with the need to dry the solidified droplets.

The residence time of the molten droplets in the suspension of volatile drops will also affect the extent of solidification. It will usually be preferred to limit the height of the suspension zone in the tower to less than 15 meters, e.g. 2 to 10 meters. It is also preferred that the suspension zone does not extend right up to the means by which the molten droplets are formed and it is usually desirable to remove the gas stream 0.4 to 2 meters below the means so as to leave a clear zone at the top of the tower. It is also preferred that the suspension zone does not extend right to the base of the tower in order that at least some of the excess volatile material which may remain on the surface of the partially solidified molten droplets is evaporated off by the residual heat still retained by the partially solidified molten droplet. To this end it will usually be desired to inject the volatile material some way up the tower so as to leave a clear zone, e.g. 1 to 8 meters deep, below the suspension zone.

In view of the inter-relationships outlined above it is not possible to give concise conditions under which the prilling tower should be operated. However, in general: (1) the molten droplets will have an initial temperature slightly higher than, e.g. 2°–10° C above, their solidification temperature (although temperatures as much as 40° C above the solidification point may be used in the case of sulphur and high melting materials); (2) the molten droplets will be approximately the same size as that desired for the final product; (3) the depth of the zone in the tower in which the suspension flows and the volatile material is carried by the gas stream is such that at least 10%, preferably about 30%, by weight of the material in each molten droplet solidifies as it passes through the flow of volatile drops; (4) the drops of volatile material injected into the tower will have an initial means size in the range 60 to 500, e.g. 70–200 micrometers; and (5) the velocity will be from 0.10 to 10, preferably from 0.45 to 6, meters per second.

After they have fallen through the suspension of drops, the molten droplets will be partially or wholly solidified as indicated above. These droplets are recovered from the foot of the prilling tower by any suitable method and may be given a further cooling and/or drying treatment if desired, although it may prove possible in some cases to achieve adequate drying in the clear zone below the suspension zone.

In a particularly preferred form of the process of the invention a cushion, into which the partially solidified droplets fall and are cooled further before being removed, is formed below the suspension of drops. By providing the cushion, the height of the prilling tower may be yet further reduced. The cushion may take a number of forms. Thus, it may be a fluidized bed of solid particles fluidized either by the gas stream which is to carry the drops of volatile material or by a separate gas stream. The bed may be composed of the solidified droplets or of some other material, notably one with which the solidified droplet is to be coated or impregnated. By controlling the conditions above the fluidized bed, the adhesive properties of the surface of the molten droplets may be modified thus controlling the amount of bed particles picked up by the droplet during its residence in the bed. In order to improve the cooling effect of the bed, cooling heat exchanger surfaces, e.g. coiled pipes, may be immersed in the bed.

The fluidized bed may be formed from a wide range of materials of any suitable size, e.g. of less than about 200 mesh BSS. Examples of suitable materials include the material being prilled; limestone; sand; mica; gypsum, bentonite; montmorillonite; attapulgite; kieselguhr; talc; fertilizer materials, such as potassium and ammonium salts of phosphoric, sulphuric or nitric acids, potassium chloride and potassium metaphosphate; magnesium and aluminium salts or compounds, such as the oxides, nitrate or carbonates thereof and hydrates thereof; basic slag; phosphate rock; cements; clays and earths. Mixtures of materials may be used if desired.

Alternatively, the cushion may be a pool of a liquid into which the droplets fall. This liquid may be the same as the volatile material in the suspension of drops or may be different. Thus, the liquid could be a mineral oil of the type commonly used to coat fertilizer granules or it could be a solvent material to remove excess volatile material picked up by the molten droplets as they passed through the suspension of drops. The liquid may be cooled in order to ensure more rapid solidification of the droplets.

It is preferred that the cushion lie some distance e.g. 1 to 8 meters below the suspension zone in the tower in order that volatile material may be evaporated from the droplets before they enter the cushion.

The invention will now be illustrated in the following Examples in which all parts and percentages are by weight:

EXAMPLE 1

Molten ammonium nitrate at 171° C was prilled down a glass column 4.5 meters high and 7.5 cms internal diameter at a rate of 3 kgs per hour. Air was blown at a rate of 0.67 meters/sec up the tower through a bed of commercial Fullers earth of particle size 2 to 50 micrometers. This formed a fluidized bed of particles whose upper surface was about 3.5 meters below the point of entry of the molten ammonium nitrate droplets. A fine spray of water (mean droplet size 100 micrometers) was introduced at the rate of 8 mls/second into the column just above the fluidized bed in a carrier stream of air. The product was a spherical prill, average size 2.5 mms which carried 1.1% of Fullers earth. When no water was sprayed in the tower the product was poorly shaped and carried 4.26% of Fullers earth. It was necessary to increase the distance between the point of entry of the molten droplets and the top surface of the fluidized bed to 5.5 meters before an acceptable shaped product was obtained, and this still carried 4% of the Fullers earth.

EXAMPLE 2

Molten sulphur at a temperature of 120° C was prilled down a column 4.5 meters high and 7.6 cm internal diameter at a rate of 3 kgs/hour. Water was injected up the column with two pneumatic atomizing nozzles, placed 2.4 meters from the top of the column. The spray nozzles delivered a total of 0.45 1/min of water and 2.8 1/min of air and produced droplets of 100 micrometer mean diameter. The spray nozzles drew additional air at 20° C into the column so that the total air velocity, as measured at the top of the column, was about 6.0 meters/second. The mist travelled up the column for a distance of 2.0 meters before being lead out below the prilling nozzles. The sulphur droplets fell through the mist and then through 2.1 meters of mist free space below the mist to give solid prills 1–2mm in diameter at the base of the column.

EXAMPLE 3

Molten sulphur at 115° to 116° C was prilled down the column of Example 1. Air flowed up the column at 1.5 meters per second. Centrifugal water sprays were mounted 3 meters from the top of the tower to spray water droplets up the tower. By varying the water pressure, the size of the droplets produced by the nozzles could be varied. The results of these tests are summarized below:

| Water mean drop size | Nature of product |
|---|---|
| 50 micrometers | Chips and hollow fragile shells |
| 70 micrometers | Spherical prills |
| 80 micrometers | Spherical prills |
| 90 micrometers | Spherical prills |

From these results it will be seen that if the water droplet size is 50 micrometers or less, then the product is unacceptable. On the other hand when the droplet size is raised to 70 micrometers or more, the product is satisfactory and moreover the water content of the product is not raised significantly as the droplet size is increased.

I claim:

1. In a process of prilling a molten material in a cooling tower comprising:

A. directing falling droplets of a molten material selected from the group consisting of sulfur and fertilizer materials into a cooling tower having a zone formed by an upwardly flowing carrier gas stream to cool and at least partially solidify the molten droplets, and B. collecting the at least partially solidified droplets at the bottom of the cooling tower and permitting all the droplets to completely solidify, the improvement wherein C. the carrier gas stream in said zone carries suspended therein, droplets of a volatile material having a mean drop diameter of 60 to 500 micrometers, said volatile material being such that it volatilizes into vapors on contact with the droplets of said molten material whereby heat is removed from the molten material droplets so as to cool and form at least a solidified skin on said droplets, said carrier gas being at least saturated with the vapors of the volatile material such that the carrier gas varies between a saturated and supersaturated state in respect to the vapors of volatile material, said carrier gas flowing counter-current to the molten droplets at a velocity of 0.1 to 10 meters per second with the proviso that the velocity of the carrier gas does not exceed the terminal velocity of the droplets of the falling molten material.

2. A process as claimed in claim 1, wherein the volatile material is water.

3. A process as claimed in claim 1, wherein the molten material is sulphur.

4. A process as claimed in claim 1, wherein the molten material is selected from the group consisting of ammonium nitrate, ammonium sulphate nitrate, ammonium phosphate, mixtures of ammonium nitrate with mono- or di-ammonium phosphate, potassium chloride, magnesium nitrate, potassium phosphate, potassium nitrate, sodium nitrate, urea and mixtures thereof.

5. A process as claimed in claim 1, wherein the droplets of volatile material are carried in a stream of air.

6. A process as claimed in claim 1, wherein from 10 to 30% by weight of each of the molten droplets solidifies as the droplet passes through the flow of droplets of volatile material.

7. A process as claimed in claim 1, wherein the droplets of the molten material fall first through a zone 0.4 to 2 meters deep which is substantially free from droplets of volatile material, then through a zone 2 to 10 meters deep containing the said upward flow of gas containing the said droplets of volatile material and vapors of said volatile material and finally through a zone at the bottom of the tower 1 to 8 meters deep which is substantially free from droplets of the volatile material.

8. A process as claimed in claim 7, wherein the solid skinned droplets are collected in a fluidized bed of particles.

9. A process as claimed in claim 7, wherein the solid skinned droplets are collected in a pool of liquid.

10. A process as claimed in claim 7, wherein the molten material is sulfur and the volatile material is water.

* * * * *